(12) United States Patent
Su

(10) Patent No.: US 10,915,184 B1
(45) Date of Patent: Feb. 9, 2021

(54) OBJECT NAVIGATION DEVICE AND OBJECT NAVIGATION METHOD

(71) Applicant: PixArt Imaging Inc., Hsin-Chu (TW)

(72) Inventor: Tse-Chung Su, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/739,138

(22) Filed: Jan. 10, 2020

(51) Int. Cl.
*G06F 3/0354* (2013.01)

(52) U.S. Cl.
CPC ................ *G06F 3/03543* (2013.01)

(58) Field of Classification Search
CPC .................................................. G06F 3/03543
USPC ......................................................... 345/163
See application file for complete search history.

(56) References Cited

U.S. PATENT DOCUMENTS

| 2008/0297478 | A1* | 12/2008 | Hotelling | G06F 21/31 345/163 |
| 2014/0292689 | A1* | 10/2014 | Akatsuka | G06F 3/038 345/173 |
| 2018/0088686 | A1* | 3/2018 | Zuber | G06F 3/03544 |

\* cited by examiner

*Primary Examiner* — Mark Edwards
(74) *Attorney, Agent, or Firm* — Winston Hsu

(57) ABSTRACT

An object navigation device comprising: at least one touch sensing surface; a control circuit, for setting a direction of the object navigation device according to a touch sensing condition. The touch sensing condition comprises at least one of following conditions: a number of touch regions, at least one relative position of touch regions, shapes of touch regions, tilting angle of at least one object touching the touch sensing surface. A corresponding object navigation method is also disclosed. By this way, the direction of the object navigation device can be automatically set according to the touch sensed by the object navigation device.

12 Claims, 12 Drawing Sheets

OBJECT NAVIGATION DEVICE AND OBJECT NAVIGATION METHOD

BACKGROUND OF THE INVENTION

1. Field of the Invention

The present invention relates to an object navigation device and an object navigation method, and particularly relates to an object navigation device and an object navigation method which can set a direction of the object navigation device according to a touch sensing condition.

2. Description of the Prior Art

An object navigation device, such as an optical mouse, a touch control device, or a pointing device, can detect relative movements between an object and itself. The object can be, for example, a finger or a specific surface, or a light source.

The direction (e.g. forward, backward, up, down) of such object navigation device is always fixed. For example, for an optical mouse, a narrow part thereof always means forward. However, if the object navigation device has a symmetry shape such as cylindrical or rod-shaped and has no specific mark, the user is hard to find a correct direction of the navigation device.

SUMMARY OF THE INVENTION

Therefore, one objective of the present invention is to provide an object navigation device which can automatically set a direction thereof.

Another objective of the present invention is to provide an object navigation method which can automatically set a direction of the object navigation device.

One embodiment of the present invention provides an object navigation device, which comprises: at least one touch sensing surface; a control circuit, configured to set a direction of the object navigation device according to a touch sensing condition related with at least one touch sensed by the touch sensing surface. The touch sensing condition comprises at least one of following conditions: a number of touch regions, at least one relative position of touch regions, shapes of touch regions, tilting angle of at least one object touching the touch sensing surface.

Another embodiment of the present invention provides an object navigation method, applied to an object navigation device comprising at least one touch sensing surface. The object navigation method comprises: (a) setting a direction of the object navigation device according to a touch sensing condition related with at least one touch sensed by the touch sensing surface; and (b) performing an object navigation operation via the object navigation device based on the direction. The touch sensing condition comprises at least one of following conditions: a number of touch regions, at least one relative position of touch regions, shapes of touch regions, tilting angle of at least one object touching the touch sensing surface. In one embodiment, the touch sensing condition further comprises at least one of following conditions: existence of at least one first touch sensing region smaller than a first predetermined size and at least one second touch sensing region larger than a second predetermined size which is larger than the first predetermined size.

In view of above-mentioned embodiments, the direction of the object navigation device can be automatically set according to the object touching the object navigation device, thus the problem of difficult direction determination in prior art can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, the components in each device can be implemented by hardware (e.g. circuit or device) or firmware (e.g. a processor installed with at least one program). Additionally, the terms "first", "second" . . . and the like in following descriptions are only for defining different components, different steps or different parameters, but do not mean the sequence thereof.

Figure 1:
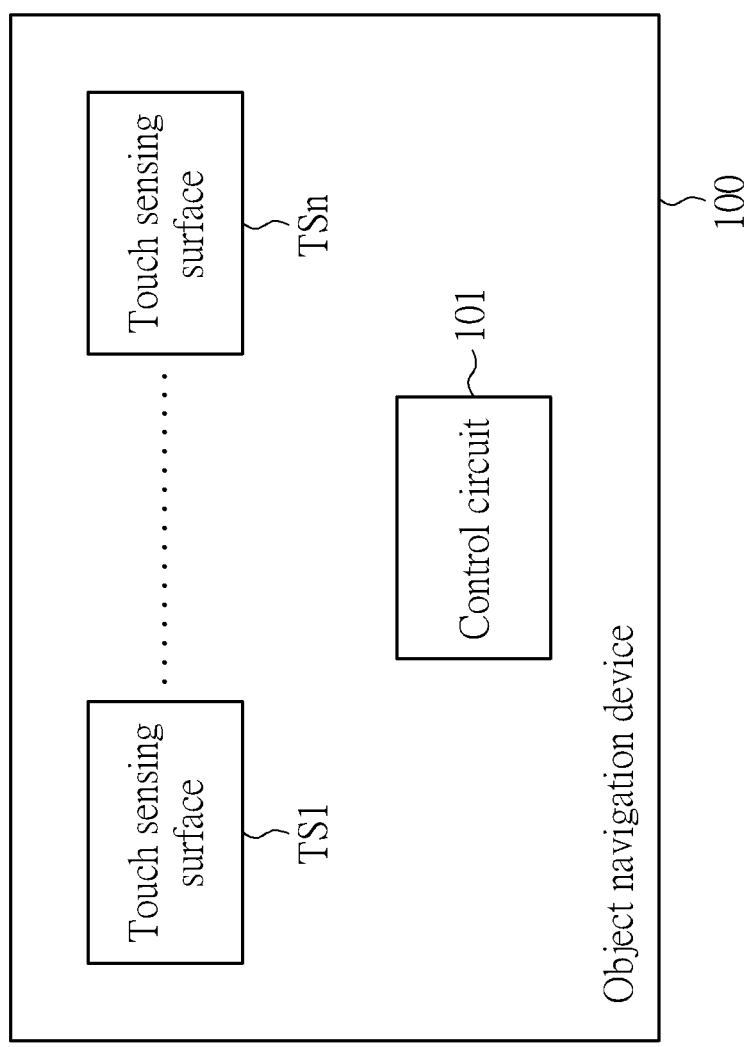
FIG. 1 is a block diagram illustrating an object navigation device according to one embodiment of the present invention.

FIG. 1 is a block diagram illustrating an object navigation device according to one embodiment of the present invention. As illustrated in FIG. 1, the object navigation device 100 comprises at least one touch sensing surface TS1 . . . TSn, and a control circuit 101. The control circuit 101 is configured to set a direction of the object navigation device 100 according to a touch sensing condition. Each of the touch sensing surfaces TS1 . . . TSn is configured to sense at least one touch of at least one object to generate the touch sensing condition. Also, each of the touch sensing surface TS1 . . . TSn can apply various kinds of touch sensing mechanisms, such as an optical touch sensing mechanism or a capacitive touch sensing mechanism, but not limited.

The touch sensing condition comprises at least one of following conditions: a number of touch regions, at least one relative position of touch regions, shapes of touch regions, at least one tilting angle of at least one object touching the touch sensing surface, existence of at least one first touch sensing region smaller than a first predetermined size and at least one second touch sensing region larger than a second predetermined size which is larger than the first predetermined size. For example, the touch sensing condition can comprise the number of touch regions and at least one relative position of touch regions. For another example, the touch sensing condition can comprise shapes of touch regions and at least one tilting angle of at least one object touching the touch sensing surface. Additionally, in following embodiments, the object is a finger or a palm, but the object can be any other object, such as a touch pen. Further, in one embodiment, the above-mentioned first touch sensing region is formed by a finger and the second touch sensing region is formed by a palm, but not limited.

Figure 2:
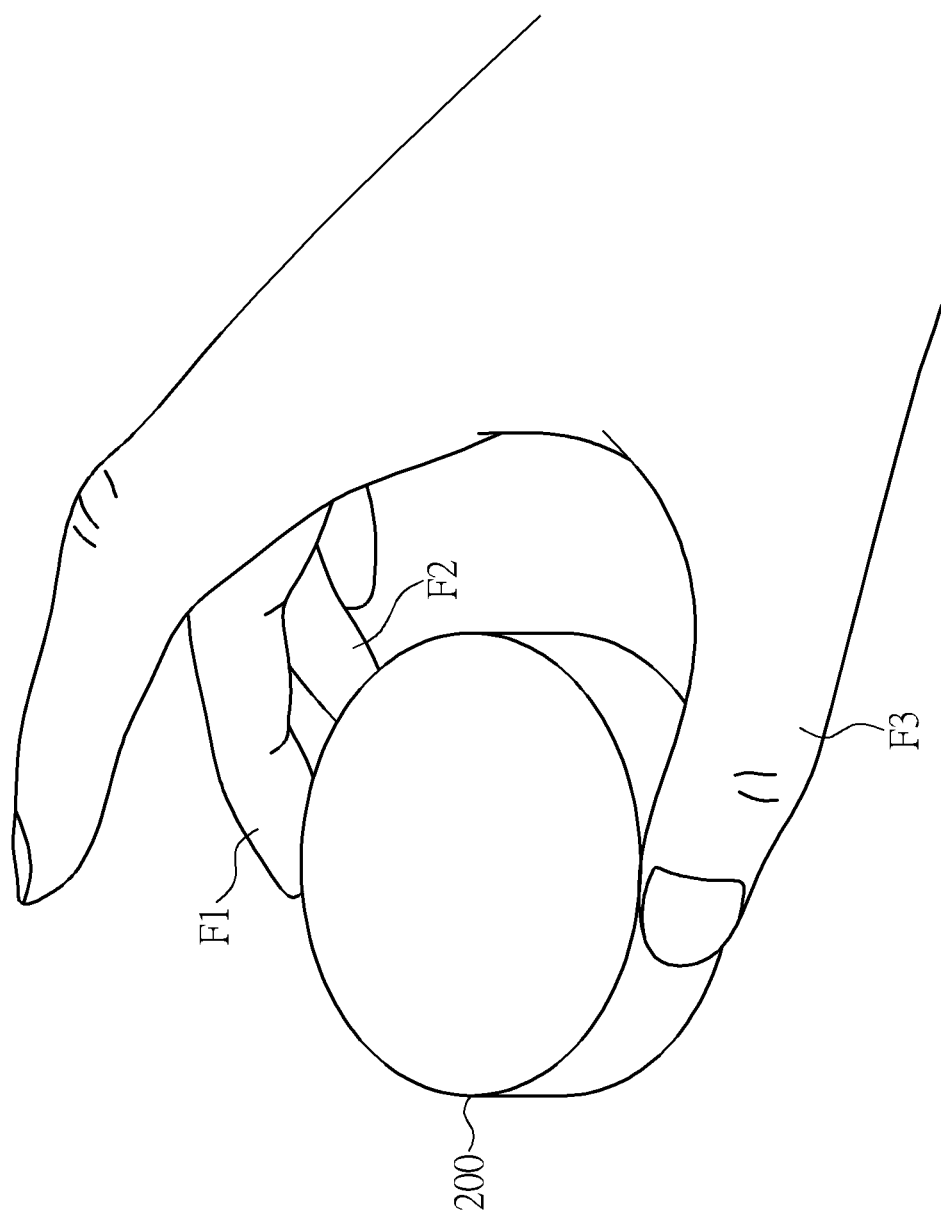
FIG. 2-FIG. 11 are schematic diagrams illustrating operations of the object navigation device according to different embodiments of the present invention.
Figure 3:
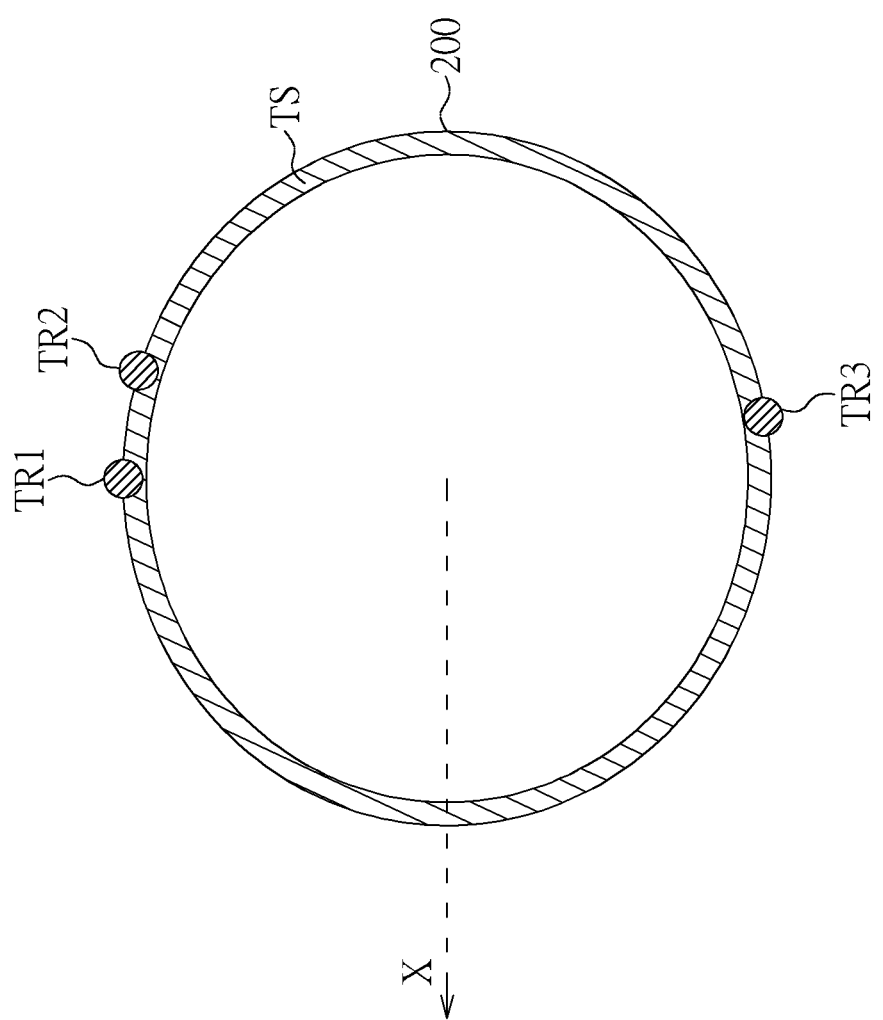

FIG. 2 and FIG. 3 are schematic diagrams illustrating operations of the object navigation device 200 according to one embodiment of the present invention. Please also refer to FIG. 3 while referring to FIG. 2 to understand the concept of the present invention for more clarity. As shown in FIG. 3, the object navigation device 200 comprises a touch sensing surface TS. In the embodiment of FIG. 3, the object navigation device 200 is cylindrical and the touch sensing surface TS makes a full circle around the object navigation device 200. However, the touch sensing surface TS can be provided to only partial of the object navigation device 200. Further, the touch sensing surface TS can consist of several independent touch sensing surfaces, rather than be integrated to a single touch sensing surface.

As shown in FIG. 2, the user uses three fingers F1, F2 and F3 touching the sensing surface TS to move the object navigation device 200, thus respectively generate the first touch region TR1, the second touch region TR2 and the third touch region TR3 in FIG. 3. In such case, the user may use the left direction of the object navigation device 200 as the forward direction. Therefore, in the embodiment of FIG. 2, the control circuit 101 sets the X direction as a forward direction, as shown in FIG. 3.

In one embodiment, the object navigation device 200 can operate in a right hand mode or in a left hand mode. If the object navigation device 200 is set in the right hand mode or be determined to operate in the right hand mode. The case illustrated in FIG. 3 can be determined that the third touch region TR3 corresponds to the thumb of the user and the forward direction is left (i.e. the X direction). On the opposite, if the object navigation device 200 is set in the left hand mode or be determined to operate in the left hand mode. The case illustrated in FIG. 3 will be determined that the third touch region TR3 corresponds to the thumb of the user and the forward direction is right.

Besides set by the user, various methods can be applied to determine whether the right hand mode or the left hand does the object navigation device 200 operate in. For example, the object navigation device 200 can record the relations between the touch regions of the fingers F1, F2, F3 (e.g. the location, the size) in the right hand mode and record the relations between the touch regions of the fingers F1, F2, F3 in the left hand mode. Further, in another example, if the user's palm also touches the object navigation device 200 while the finger's F1, F2, F3, the object navigation device 200 can record the relations between the touch regions of the fingers F1, F2, F3 and the palm in the right hand mode and record the relations between the touch regions of the fingers F1, F2, F3 and the palm in the left hand mode. By these methods, the object navigation device 200 can automatically determine whether the right hand mode or the left hand does the object navigation device 200 operate in.

The object navigation device 200 in FIG. 2 and FIG. 3 can be regarded as an object navigation device which sets a direction thereof based on the touch sensing condition comprising the number of touch regions and the relative positions of touch regions. Specifically, the control circuit 101 sets the direction according to if a first distance between a touch region (e.g. the third touch region TR3) and another group of touch region (in this example, the first touch region TR1 and the second touch region TR2) is larger than the second distance between each one of the touch regions in the group of the touch regions.

In the embodiment of FIG. 3, the distance between the first touch region TR1 and the third touch region TR3, which is larger than a half length of the touch sensing surface TS, is larger than the distance between the second touch region TR2 and the third touch region TR3, which is smaller than a half length of the touch sensing surface TS.

In one embodiment, the touch region (e.g. the third touch region TR3) which has a larger distance from another group of touch regions (e.g. the first touch region TR1 and the second touch region TR2) is determined as a thumb touch region. Also, in such case, the forward direction can be set from a distance region between the thumb touch region and one touch region in the group of touch regions which has a smaller distance from the thumb touch region (e.g. the second touch region TR2 in FIG. 3) to a distance region between the thumb touch region and another touch region in the group of touch regions which has a larger distance from the thumb touch region (e.g. the first touch region TR1 in FIG. 3). Please note, the above-mentioned "distance" between two touch regions does not overlap with another touch region. For example, the distance between the second touch region TR2 and the third touch region TR3 means the distance located at the right of the second touch region TR2 and the third touch region TR3 rather than the distance located at the left of the second touch region TR2 and the third touch region TR3.

Figure 4:
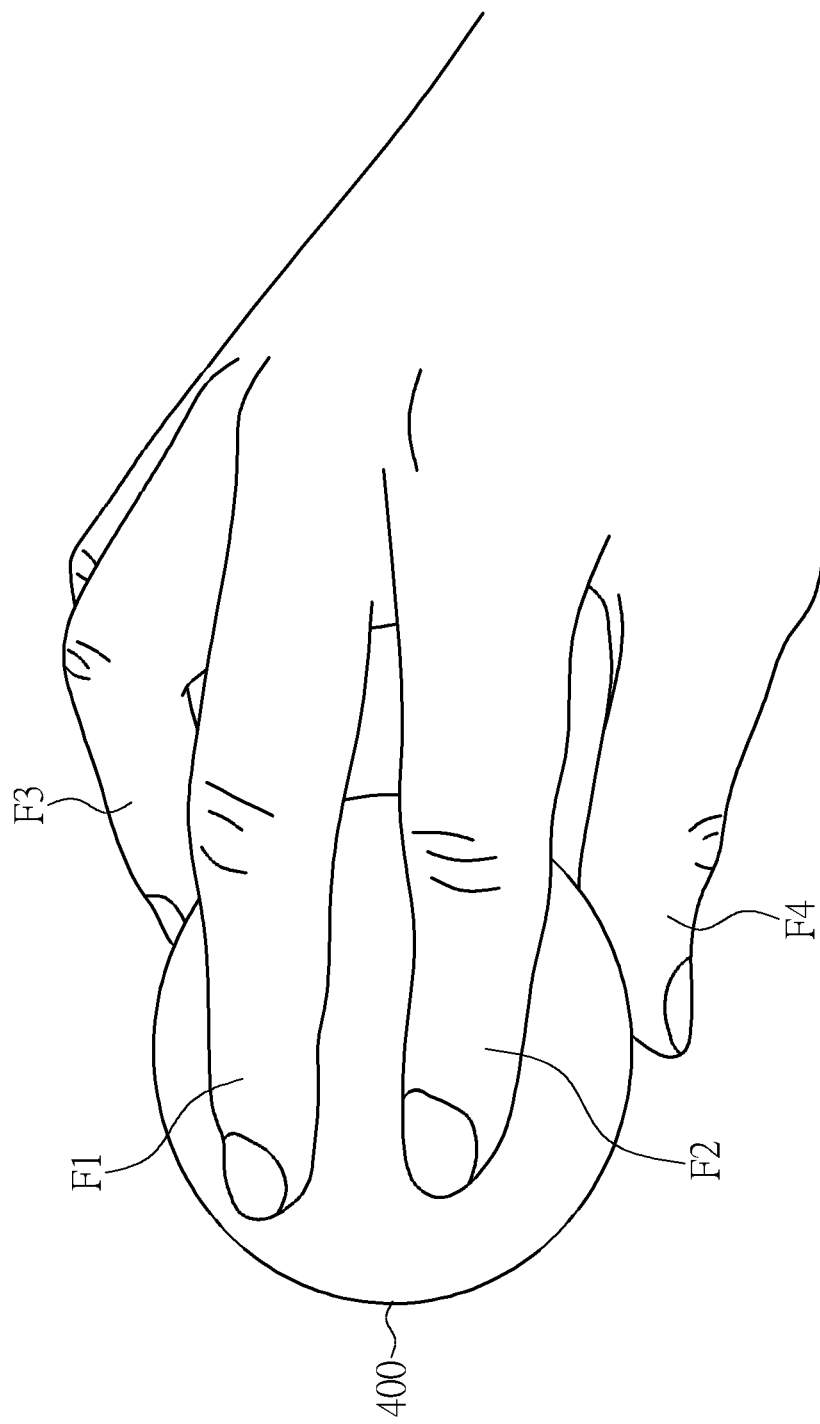
Figure 5:
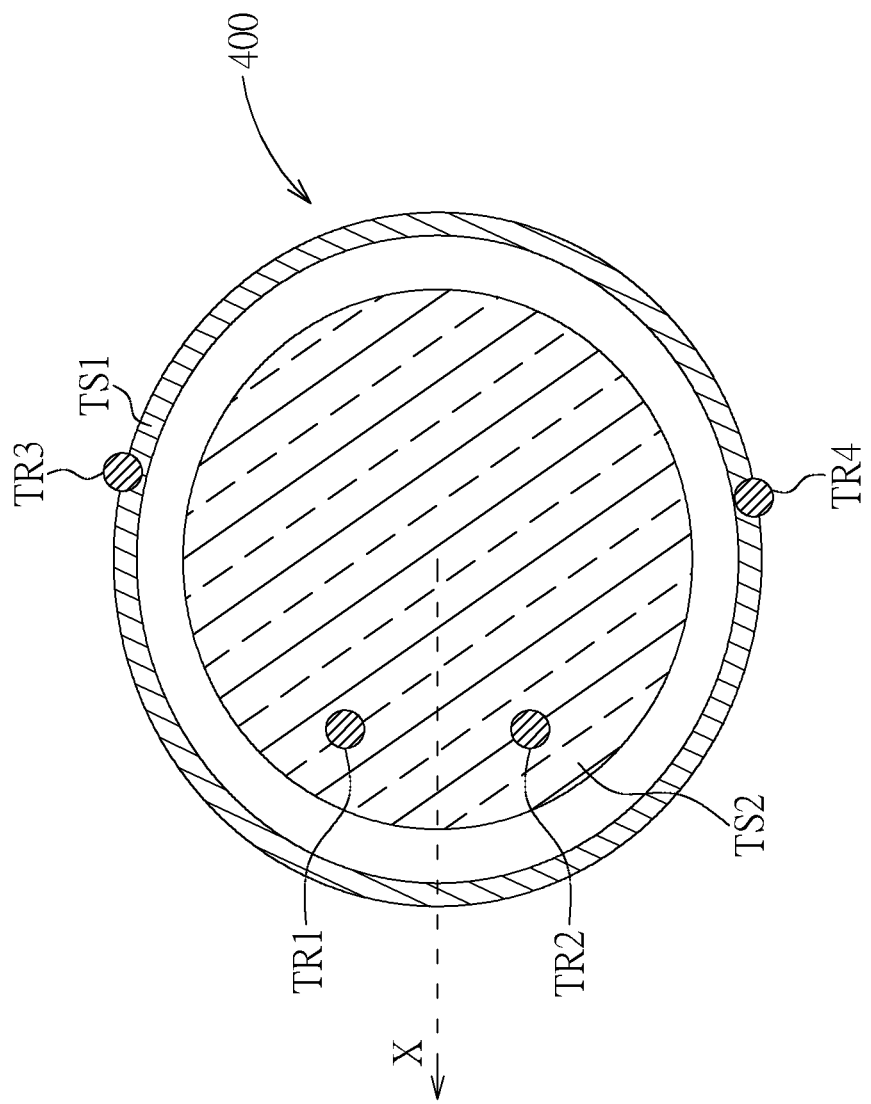

FIG. 4 and FIG. 5 are schematic diagrams illustrating operations of the object navigation device 400 according to another embodiment of the present invention. Please also refer to FIG. 5 while referring to FIG. 4 to understand the concept of the present invention for more clarity. As shown in FIG. 5, the object navigation device 400 comprises a sensing surface TS1 making a full circle around the object navigation device 400 and a second touch sensing surface TS2 perpendicular with the first touch sensing surface TS1. However, the touch sensing surface TS can be provided to only partial of the object navigation device 400. Further, the touch sensing surface TS can consist of several independent touch sensing surfaces, rather than be integrated to a single touch sensing surface.

Also, as shown in FIG. 4, the user uses two fingers F1, F2 touching the second sensing surface TS2, a finger F3 and a finger F4 touching the first sensing surface TS1 to move the object navigation device 400, thus respectively generate the first touch region TR1, the second touch region TR2, the third touch region TR3 and the fourth touch region TR4 in FIG. 5. In such case, the user may use the left direction of the object navigation device 400 as the forward direction. Therefore, in the embodiment of FIG. 4, the control circuit 101 sets the X direction as a forward direction, as shown in FIG. 5.

In other words, three groups of touch sensing region are formed in the embodiments of FIG. 4 and FIG. 5, which respectively comprises at least one touch sensing region. For example, the first group of touch sensing region comprises the third touch sensing region TR3, the second group of touch sensing region comprises the first touch sensing region TR1 and the second touch sensing region TR2, and the third group of touch sensing region comprises the fourth touch sensing region TR4. Further, the direction of the object navigation device 400 is determined according to the second group of touch sensing region located between the first group of touch sensing region and the third group of touch sensing region.

Specifically, the control circuit 101 sets the direction according to a relative relation between the second group of touch region and the first group of touch region, and a relative relation between the second group of touch region and the third group of touch region. For example, if the second group of touch region is close to the left but the first group of touch region, the third group of touch region is close to the right, it means the object navigation device 400 is in the right hand mode and the forward direction is left. On the opposite, if the second group of touch region is close to the right but the first group of touch region, the third group of touch region is close to the left, it means the object navigation device 400 is in the left hand mode and the forward direction is right.

The object navigation device 400 in FIG. 4 and FIG. 5 can be regarded as an object navigation device which sets a direction thereof based on the touch sensing condition comprising the number of touch regions and the relative positions of touch regions. Specifically, the control circuit 101 sets the direction according to if at least one of the touch region (e.g. the third touch region TR3) is located on the first touch sensing surface TS1 while at least one of the touch region is located on the second touch sensing surface TR2 (e.g. the first touch region TR1 and the second touch sensing region TR2).

Figure 6:
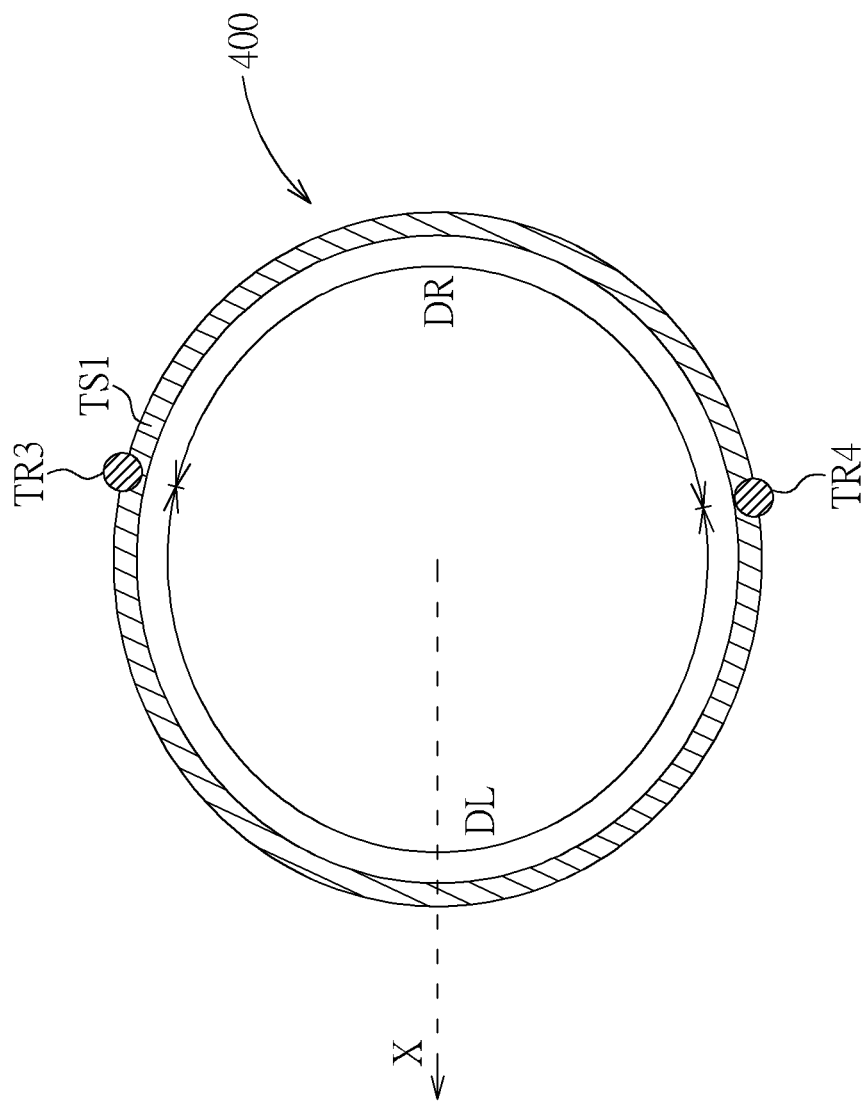

In one embodiment, the object navigation device 400 comprises the first touch sensing surface TS1 making a full circle around the object navigation device 400, but does not comprise the second sensing surface TS2. In such case, the fingers F3 and F4 respectively form the third touch region TR3 and the fourth touch region TR4 on the first touch sensing surface TS1. In the embodiment of FIG. 6, the user may use the left direction of the object navigation device 400 as the forward direction. Therefore, in the embodiment of FIG. 6, the control circuit 101 sets the X direction as a forward direction.

Locations of the third touch region TR3 and the fourth touch region TR4 in FIG. 6 may be asymmetrical. That is, the distances between the third touch region TR3 and the fourth touch region TR4 following the edge of the object navigation device 400 at different directions are different. As shown in FIG. 6, the distance DL at right of the third touch region TR3 and the fourth touch region TR4 is longer than the distance DL at left of the third touch region TR3 and the fourth touch region TR4. Therefore, the control circuit 101 in FIG. 6 sets the direction according to if touch regions exist on the first touch sensing surface TS1 and according to if the locations of the touch regions are asymmetrical. That is, the control circuit 101 sets the direction according to relative relations between locations of the touch regions on the first touch sensing surface TS1.

Figure 7:
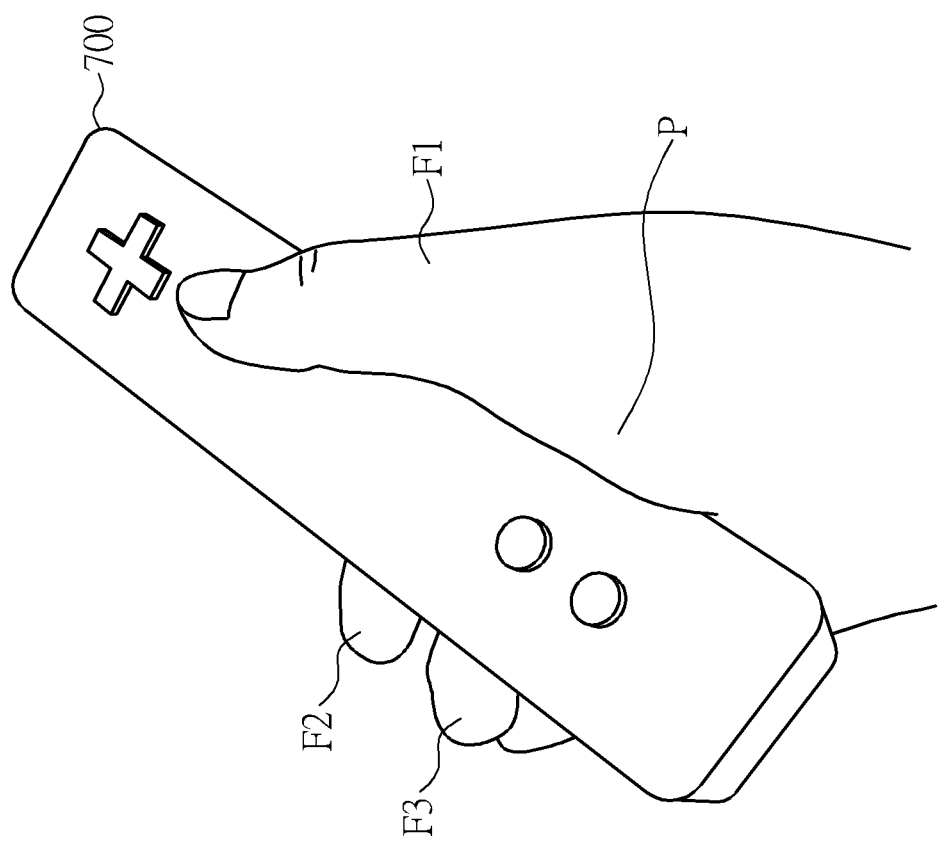
Figure 8:
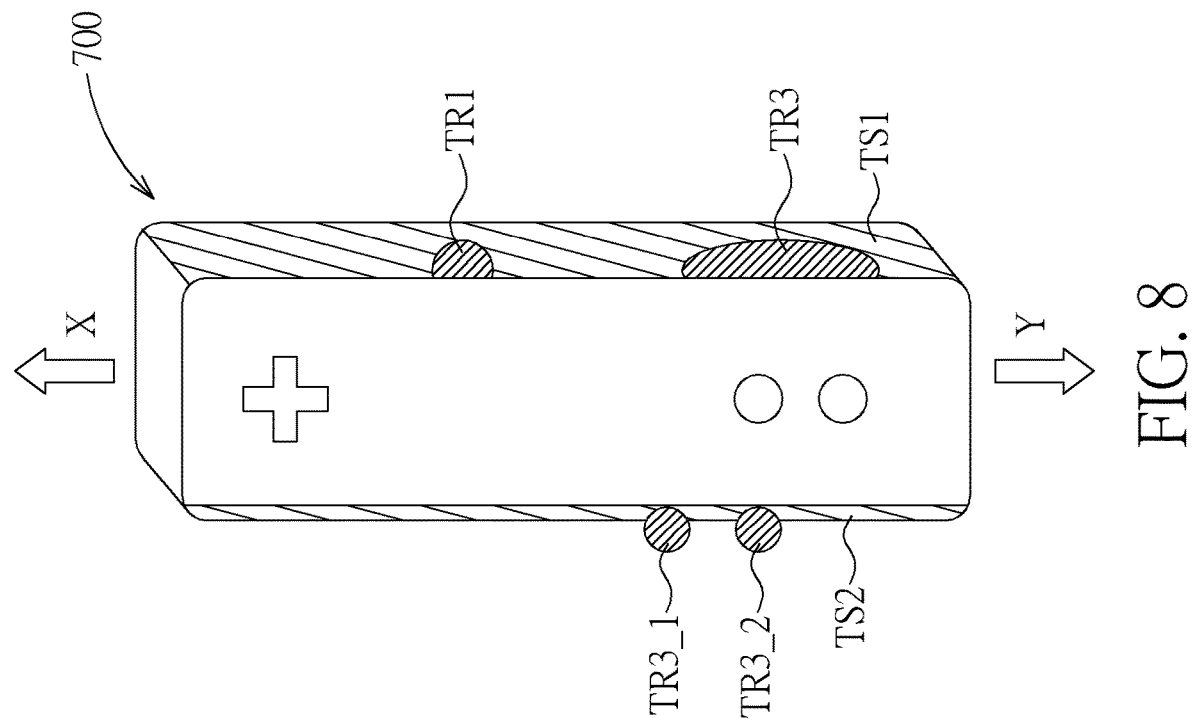

In above-mentioned embodiments, the object navigation devices are cylindrical. However, the object navigation device provided by the present invention can have any other shape. For example, the object navigation device 700 in FIG. 7 and FIG. 8 is rod-shaped. In the embodiments of FIG. 7 and FIG. 8, the object navigation device 700 comprises a first touch sensing surface TS1 and a second touch sensing surface TS2 provided at sides thereof. Accordingly, if the user holds the object navigation device 700 as shown in FIG. 7, the fingers F1 generates the first touch region TR1 on the first touch sensing surface TS1, the palm P generates the second touch region TR2 on the first touch sensing surface TS1, and the fingers F2, F3 respectively generates third touch regions TR3_1, TR3_2 on the second touch sensing surface TS2.

In such case, the user uses the direction X as an up direction. Therefore, the control circuit 101 sets the direction X in FIG. 8 as an up direction according to the locations and sizes of the first touch region TR1, the second touch region TR2 and the third touch regions TR3_1, TR3_2. Specifically, in one embodiment, the control circuit 101 sets the direction according to if the first touch sensing region TR1 smaller than a first predetermined region and the second touch sensing region TR2 larger a second predetermined region, which is larger than the first predetermined region, locate on a first touch sensing surface TS1. The control circuit 101 can further set the direction according to if at least two third touch regions (e.g. TR3_1, TR3_2) smaller than the first predetermined size is located on a second touch sensing surface TS2.

Figure 9:
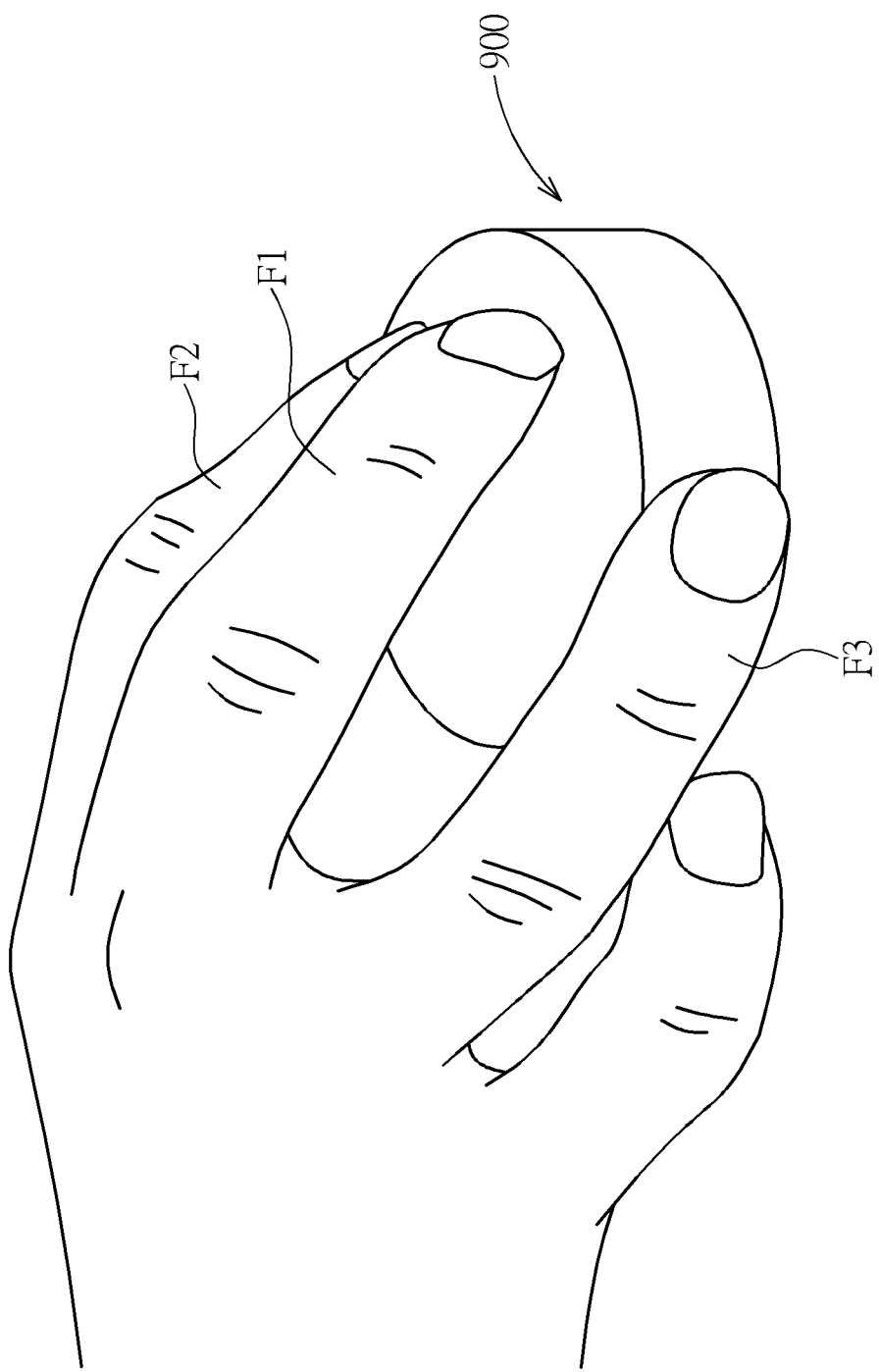
Figure 10:
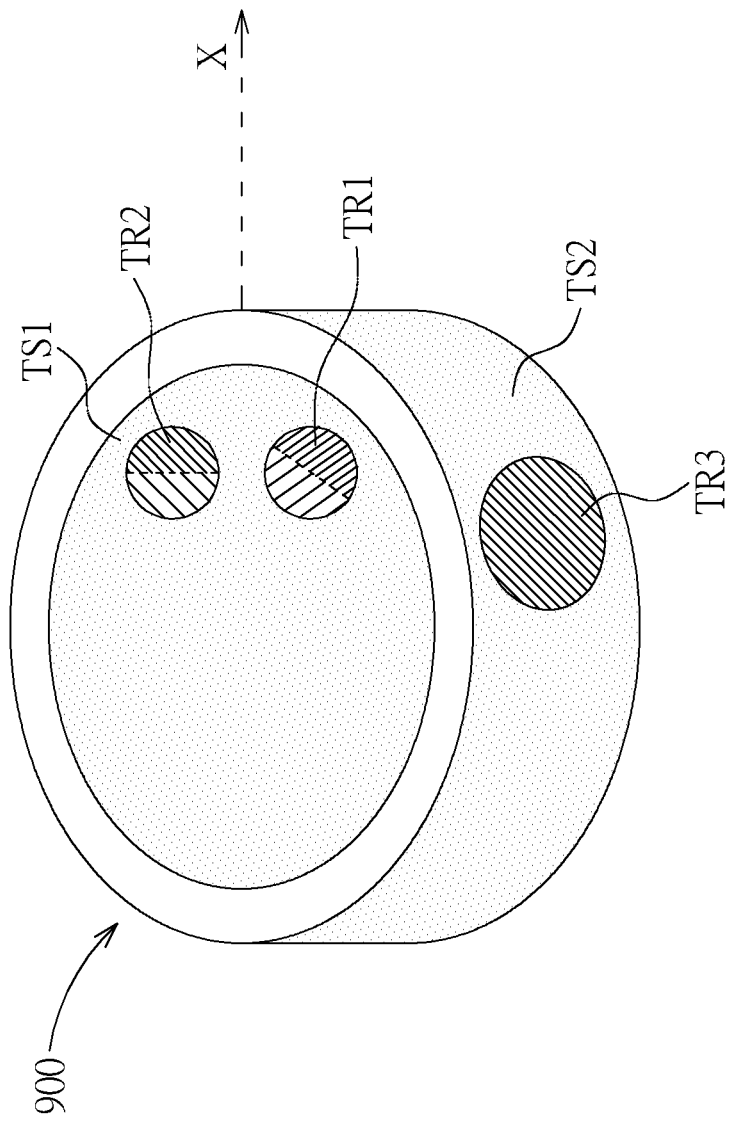

Further, the control circuit 101 can set the direction according to a tilting angle of at least one object touching the touch sensing surface. FIG. 9 and FIG. 10 are schematic diagrams illustrating operations of the object navigation device 900 according to one embodiment of the present invention.

In the embodiments of FIG. 9 and FIG. 10, the object navigation device 900 comprises a first sensing surface TS1 provided on the top thereof and a second sensing surface TS2 making a full circle around the object navigation device 200. As shown in FIG. 9, the fingers F1, F2, F3 respectively touches the first sensing surface TS1 and the second sensing surface TS2 thus correspondingly generate the first touch region TR1, the second touch region TR2 and the third touch region TR3 in FIG. 10. Also, the fingers F1, F2, F3 respectively have different relative tilting angles with the first sensing surface TS1 and the second sensing surface TS2 while touching the first sensing surface TS1 and the second sensing surface TS2. Accordingly, the first touch region TR1, the second touch region TR2 and the third touch region TR3 may respectively have different touch sensing levels corresponding to the tilting angles of the fingers F1, F2, F3. A larger touch sensing level means the corresponding part of the finger F1, the finger F2, or the finger F3 firmly touch the first sensing surface TS1 or the second sensing surface TS2. The touch sensing level can be, for example, capacitance variation if the first sensing surface TS1 and the second sensing surface TS2 are capacitive sensing surfaces. Also, the touch sensing level can be light sensing values if the first sensing surface TS1 and the second sensing surface TS2 are optical sensing surfaces.

In FIG. 10, the densities of the oblique lines indicate the touch sensing levels of the touch region. For example, the left part of the second touch region TR2 has a smaller density of oblique lines and the right part of the second touch region TR2 has a larger density of oblique lines, thus the left part of the second touch region TR2 has larger touch sensing levels and the right part of the second touch region TR2 has smaller touch sensing levels. Accordingly, the control circuit 101 can set the direction of the object navigation device 900 according to the distributions of finger tilting angles.

The tilting angle can further be applied to determine whether the object navigation device is in the right hand mode or the left hand mode. Take the embodiments of FIG. 4 and FIG. 6 for examples, the thumb finger and the ring finger form different tilting angles when the user uses the right hand to hold the object navigation device 400 and uses the left hand to hold the object navigation device 400. Accordingly, the object navigation device 400 can determine whether it operates in the right hand mode or the left hand mode according to the tilting angles.

Based upon above-mentioned embodiments, the control circuit 101 can set the direction of the object navigation device according to a touch sensing condition comprising at least one of following conditions: a number of touch regions, at least one relative position of touch regions, shapes of touch regions, tilting angle of at least one object touching the touch sensing surface, existence of at least one first touch sensing region smaller than a first predetermined size and at least one second touch sensing region larger than a second predetermined size which is larger than the first predetermined size. However, the above-mentioned embodiments are only for examples. Persons skilled in the art can vary, separate or combine the above-mentioned embodiments to reach the same function. Such variations should also fall in the scope of the present application.

Figure 11:
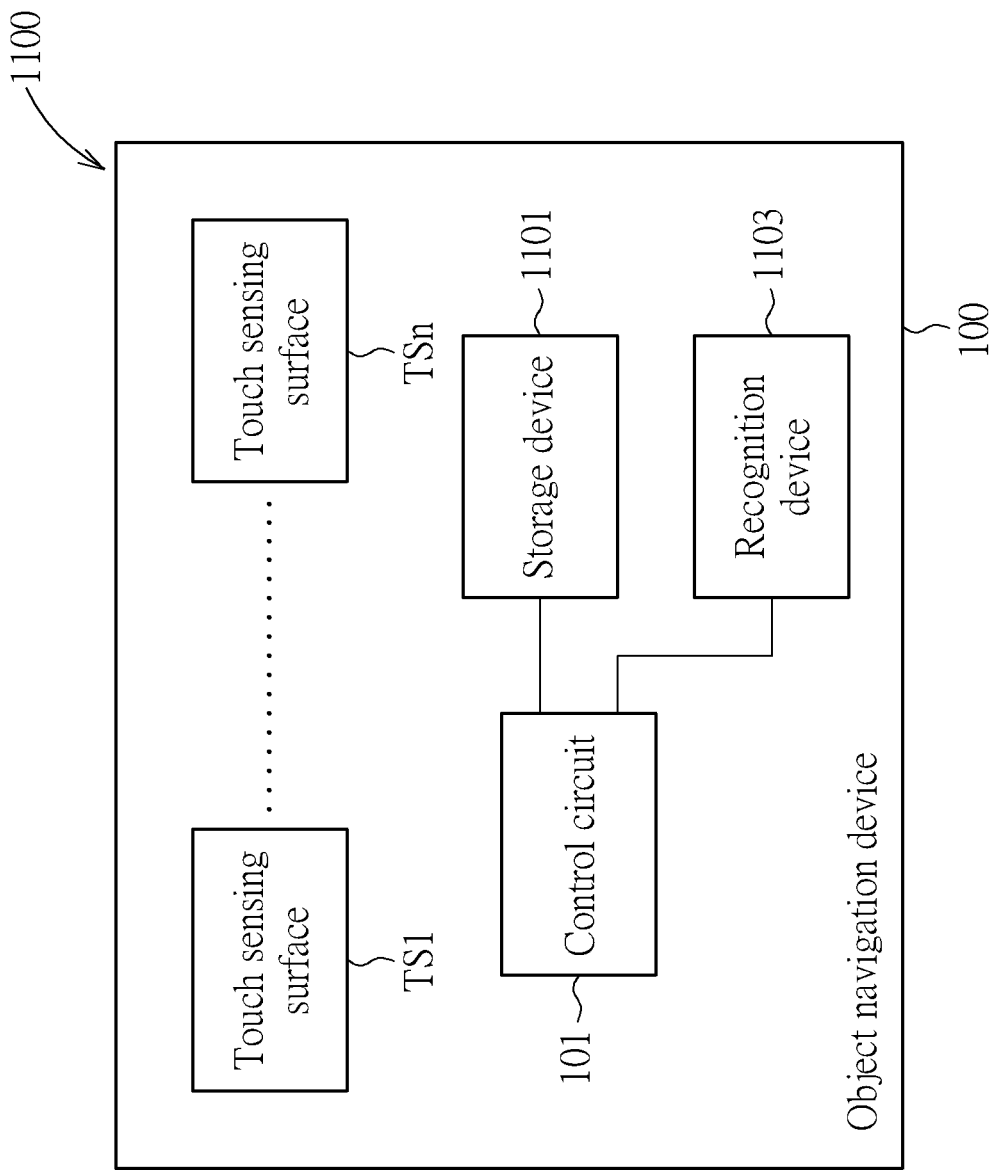

Further, in the embodiment of FIG. 11, the object navigation device 1100 further comprises a storage device 1101 which stores more than one candidate touch sensing conditions and further comprises a recognition device 1103 (e.g. a fingerprint recognition device). The control circuit 101 selects the touch sensing condition from the candidate touch sensing conditions corresponding to a recognition result generated by the recognition device. For example, the user A always moves the object navigation device by the method illustrated in FIG. 2 and the user B always moves the object navigation device by the method illustrated in FIG. 4. In such case, if the recognition device 1103 recognizes that the user A is using the object navigation device 1100, the control circuit 101 sets direction of the object navigation device 1100 according to the rules illustrated in the embodiment of FIG. 2 and FIG. 3. Also, if the recognition device 1103 recognizes that the user B is using the object navigation device 1100, the control circuit 101 sets direction of the object navigation device 1100 according to the rules illustrated in the embodiment of FIG. 4 and FIG. 5. By this way, the direction setting operation can be more accurate.

Figure 12:
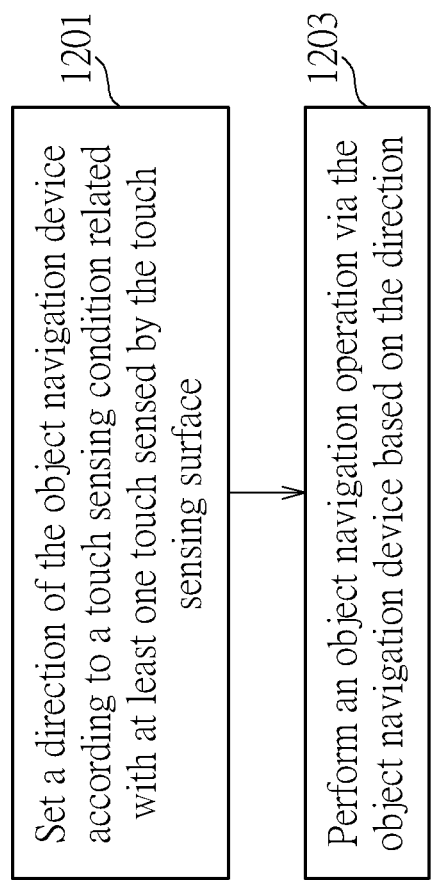
FIG. 12 is a flow chart illustrating an object navigation method according to one embodiment of the present invention.

After setting the direction, the above-mentioned object navigation device can perform an object navigation operation based on the direction. FIG. 12 is a flow chart illustrating an object navigation method according to one embodiment of the present invention, which is applied to an object navigation device comprising at least one touch sensing surface. The object navigation method comprises following steps:

Step 1201

Set a direction of the object navigation device according to a touch sensing condition related with at least one touch sensed by the touch sensing surface.

Step 1203

Perform an object navigation operation via the object navigation device based on the direction.

The touch sensing condition comprises at least one of following conditions: a number of touch regions, at least one relative position of touch regions, shapes of touch regions, tilting angle of at least one object touching the touch sensing surface, existence of at least one first touch sensing region smaller than a first predetermined size and at least one second touch sensing region larger than a second predetermined size which is larger than the first predetermined size.

The object navigation operation can mean controlling an electronic device according to the relative movement between the object and the object navigation device. For example, in above-mentioned embodiments, the object navigation device serves as a mouse, and the object is a desk surface on which the object navigation device is provided on. Also, a cursor on a display is controlled based on the relative movement between the object navigation device and the desk surface.

In view of above-mentioned embodiments, the direction of the object navigation device can be automatically set according to the touch sensed by the object navigation device, thus the problem of difficult direction determination in prior art can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object navigation device, comprising:
   at least one touch sensing surface;
   a control circuit, configured to set a direction of the object navigation device according to a touch sensing condition related with at least one touch sensed by the touch sensing surface;
   wherein the touch sensing condition comprises at least one of following conditions:
   a number of touch regions, at least one relative position of touch regions, shapes of touch regions, tilting angle of at least one object touching the touch sensing surface;
   wherein the object navigation device comprises a first touch sensing surface making a full circle around the object navigation device and a second touch sensing surface perpendicular with the first touch sensing surface;
   wherein a first group of touch regions and a third group of touch regions is located on the first touch sensing surface and a second group of touch regions is located on the second touch sensing surface and between the first group of touch regions and the third group of touch regions, wherein the control circuit sets the direction according to a relative relation between the second group of touch regions and the first group of touch regions, and a relative relation between the second group of touch regions and the third group of touch regions.

2. The object navigation device of claim 1, wherein the object is a finger or a palm.

3. The object navigation device of claim 1, wherein the first touch region is formed by a finger and the second touch region is formed by a palm.

4. The object navigation device of claim 1, further comprising a storage device storing more than one candidate touch sensing conditions and further comprising a recognition device, wherein the control circuit selects the touch sensing condition from the candidate touch sensing conditions corresponding to a recognition result generated by the recognition device.

5. The object navigation device of claim 1, being cylindrical or rod-shaped.

6. An object navigation method, applied to an object navigation device comprising at least one touch sensing surface, comprising:
   (a) setting a direction of the object navigation device according to a touch sensing condition related with at least one touch sensed by the touch sensing surface; and
   (b) performing an object navigation operation via the object navigation device based on the direction;
   wherein the touch sensing condition comprises at least one of following conditions:
   a number of touch regions, at least one relative position of touch regions, shapes of touch regions, tilting angle of at least one object touching the touch sensing surface;
   wherein the object navigation device comprises a first touch sensing surface making a full circle around the object navigation device and a second touch sensing surface perpendicular with the first touch sensing surface;
   wherein a first group of touch regions and a third group of touch regions is located on the first touch sensing surface and a second group of touch regions is located on the second touch sensing surface and between the first group of touch regions and the third group of touch regions, wherein the step (a) sets the direction according to a relative relation between the second group of touch regions and the first group of touch regions, and a relative relation between the second group of touch regions and the third group of touch regions.

7. The object navigation method of claim 6, wherein the object is a finger or a palm.

8. The object navigation method of claim 6, wherein the first touch region is formed by a finger and the second touch region is formed by a palm.

9. The object navigation method of claim 6, further comprising: providing more than one candidate touch sensing conditions, wherein the step (a) selects the touch sensing condition from the candidate touch sensing conditions corresponding to a recognition result generated by a recognition device comprised by the object navigation device.

10. The object navigation method of claim 6, being cylindrical or rod-shaped.

11. An object navigation device, comprising:
   at least one touch sensing surface;
   a control circuit, configured to set a direction of the object navigation device according to a touch sensing condition related with at least one touch sensed by the touch sensing surface;
   wherein the touch sensing condition comprises at least one of following conditions:
   a number of touch regions, at least one relative position of touch regions, shapes of touch regions, tilting angle of at least one object touching the touch sensing surface;
   wherein the control circuit sets the direction according to if a first touch region and a second touch region are located on a first touch sensing surface, and according to if at least two third touch regions smaller than a first predetermined size are located on a second touch sensing surface.

12. An object navigation method, applied to an object navigation device comprising at least one touch sensing surface, comprising:
   (a) setting a direction of the object navigation device according to a touch sensing condition related with at least one touch sensed by the touch sensing surface; and
   (b) performing an object navigation operation via the object navigation device based on the direction;
   wherein the touch sensing condition comprises at least one of following conditions:
   a number of touch regions, at least one relative position of touch regions, shapes of touch regions, tilting angle of at least one object touching the touch sensing surface;
   wherein the step (a) sets the direction according to if a first touch region and a second touch region are located on a first touch sensing surface, and according to if at least two third touch regions smaller than a first predetermined size are located on a second touch sensing surface.

* * * * *